United States Patent
Lutz

(10) Patent No.: US 10,105,650 B2
(45) Date of Patent: Oct. 23, 2018

(54) MULTI-PULSE INJECTION EVENTS FOR A DUAL-FUEL ENGINE

(71) Applicant: CUMMINS INC., Columbus, IN (US)

(72) Inventor: Timothy P. Lutz, Zionsville, IN (US)

(73) Assignee: CUMMINS INC., Columbus, IN (US)

(*) Notice: Subject to any disclaimer, the term of this patent is extended or adjusted under 35 U.S.C. 154(b) by 59 days.

(21) Appl. No.: 15/334,632

(22) Filed: Oct. 26, 2016

(65) Prior Publication Data
US 2017/0122226 A1    May 4, 2017

Related U.S. Application Data

(60) Provisional application No. 62/247,798, filed on Oct. 29, 2015.

(51) Int. Cl.
| | |
|---|---|
| F01N 3/00 | (2006.01) |
| B01D 53/94 | (2006.01) |
| F02D 41/00 | (2006.01) |
| F02D 41/40 | (2006.01) |
| F02D 19/06 | (2006.01) |
| F02D 19/08 | (2006.01) |
| F02D 19/10 | (2006.01) |
| F01N 3/10 | (2006.01) |
| F02D 41/38 | (2006.01) |

(52) U.S. Cl.
CPC ....... B01D 53/9495 (2013.01); B01D 53/944 (2013.01); F02D 19/061 (2013.01); F02D 19/0689 (2013.01); F02D 19/0692 (2013.01); F02D 19/081 (2013.01); F02D 19/105 (2013.01); F02D 41/0025 (2013.01); F02D 41/0027 (2013.01); F02D 41/402 (2013.01); *B01D 2251/208* (2013.01); *F01N 3/103* (2013.01); *F01N 2430/085* (2013.01); *F01N 2900/1602* (2013.01); *F02D 2041/389* (2013.01)

(58) Field of Classification Search
USPC .......... 60/274, 285, 286, 300; 123/299, 300, 123/305, 431, 481, 681, 198 F
See application file for complete search history.

(56) References Cited

U.S. PATENT DOCUMENTS

| | | | |
|---|---|---|---|
| 6,286,482 B1 | 9/2001 | Flynn et al. | |
| 6,675,748 B2 | 1/2004 | Ancimer et al. | |
| 6,823,722 B2 * | 11/2004 | Yamazaki | F01N 3/0814 73/114.69 |
| 7,325,529 B2 | 2/2008 | Ancimer et al. | |
| 7,720,592 B2 * | 5/2010 | Leone | F02B 17/005 123/575 |
| 8,166,956 B2 * | 5/2012 | Ulrey | F02D 19/0694 123/525 |
| 8,327,823 B2 | 12/2012 | Courtoy et al. | |
| 9,587,568 B2 * | 3/2017 | Joshi | F02D 41/40 |
| 2010/0030449 A1 * | 2/2010 | Ikoma | F02D 41/08 701/103 |

(Continued)

*Primary Examiner* — Binh Q Tran
(74) *Attorney, Agent, or Firm* — Faegre Baker Daniels LLP

(57) ABSTRACT

A method includes supplying a first quantity of a first fuel to an engine and supplying a charge including a second fuel and air to the engine. The first fuel is different from the second fuel. The method further includes mixing the first fuel with the charge, supplying a second quantity of the first fuel to the engine, and igniting at least a portion of the first and second fuels in response to supplying the second quantity of the first fuel.

24 Claims, 8 Drawing Sheets

(56) References Cited

U.S. PATENT DOCUMENTS

2013/0019588 A1     1/2013   Richardson et al.
2014/0158086 A1*   6/2014   Matsuda ............. F02D 13/0207
                                                                    123/294

* cited by examiner

MULTI-PULSE INJECTION EVENTS FOR A DUAL-FUEL ENGINE

CROSS-REFERENCE TO RELATED APPLICATIONS

The present application claims priority to U.S. Provisional Patent Application Ser. No. 62/247,798, filed on Oct. 29, 2015, and entitled "MULTI-PULSE INJECTION EVENTS FOR A DUAL-FUEL ENGINE", the complete disclosure of which is expressly incorporated by reference herein.

TECHNICAL FIELD

The present disclosure relates generally to a dual-fuel engine and, more particularly, to a fuel system configured for a plurality of fuel injection strategies.

BACKGROUND OF THE DISCLOSURE

A dual-fuel engine may operate with only one source of fuel and/or may operate with two separate sources of fuel. For example, a dual-fuel engine may be configured to operate in a single-fuel mode when only a liquid fuel is supplied and/or may be configured to operate in a dual-fuel mode when both liquid and gaseous fuels are supplied. When the engine operates in the dual-fuel mode, both gaseous and liquid fuels may be introduced into a combustion chamber of an engine to result in combustion therein.

SUMMARY OF THE DISCLOSURE

In one embodiment of the present disclosure, a method comprises supplying a first quantity of a first fuel to an engine and supplying a charge including a second fuel and air to the engine. The first fuel is different from the second fuel. The method further comprises mixing the first fuel with the charge, supplying a second quantity of the first fuel to the engine, and igniting at least a portion of the first and second fuels in response to supplying the second quantity of the first fuel.

In another embodiment of the present disclosure, a method comprises supplying a first quantity of a liquid fuel to a cylinder, supplying a charge including a gaseous fuel and air to the cylinder, combusting at least a portion of the liquid and gaseous fuels in response to supplying the second quantity of the liquid fuel, and supplying a second quantity of the liquid fuel after combusting at least a portion of the liquid and gaseous fuels.

In a further embodiment of the present disclosure, a fuel system comprises a control system, a first fuel control member operably coupled to the control system to release a first fuel, and a second fuel control member operably coupled to the control system to release a first quantity of a second fuel during a pre-combustion portion of a fuel cycle to mix with the first fuel and a second quantify of the second fuel during a combustion portion of the fuel cycle.

In another embodiment of the present disclosure, a method includes supplying the first quantity of the first fuel includes supplying diesel fuel and supplying the charge includes supplying natural gas.

In a further embodiment of the present disclosure, a method includes igniting at least a portion of the first and second fuels after supplying the first quantity of the first fuel and mixing the first fuel with the charge.

In another embodiment of the present disclosure, a method evaporating the first quantity of the first fuel prior to igniting at least a portion of the first and second fuels.

In a further embodiment of the present disclosure, a method includes mixing the first fuel with the charge after evaporating the first quantity of the first fuel.

In another embodiment of the present disclosure, a method includes igniting at least a portion of the first quantity of the first fuel before supplying the second quantity of the first fuel.

In a further embodiment of the present disclosure, a method includes that the first quantity of the first fuel is less than the second quantity of the first fuel and, in one embodiment, that the first quantity of the first fuel is less than half of the second quantity of the first fuel.

In another embodiment of the present disclosure, a method includes supplying a third quantity of the first fuel after igniting at least a portion of the first and second fuels.

In a further embodiment of the present disclosure, a method includes exhausting the second quantity of the liquid fuel from the cylinder and directing the second quantity of the liquid fuel to an after-treatment assembly.

In another embodiment of the present disclosure, a method includes reacting the second quantity of the liquid fuel with an oxidation catalyst of the after-treatment assembly.

In a further embodiment of the present disclosure, a method includes increasing a temperature of the after-treatment assembly in response to reacting the second quantity of the liquid fuel and oxidizing uncombusted hydrocarbons of the gaseous fuel in the after-treatment assembly in response to increasing the temperature of the after-treatment assembly.

In another embodiment of the present disclosure, a fuel assembly includes a control system configured to release a third quantity of the second fuel during a post-combustion portion of the fuel cycle.

In a further embodiment of the present disclosure, a fuel assembly includes a control system configured to release the first fuel during the pre-combustion portion of a fuel cycle.

BRIEF DESCRIPTION OF THE DRAWINGS

The above-mentioned and other features of this disclosure and the manner of obtaining them will become more apparent and the disclosure itself will be better understood by reference to the following description of embodiments of the present disclosure taken in conjunction with the accompanying drawings, wherein.

Figure 1A:
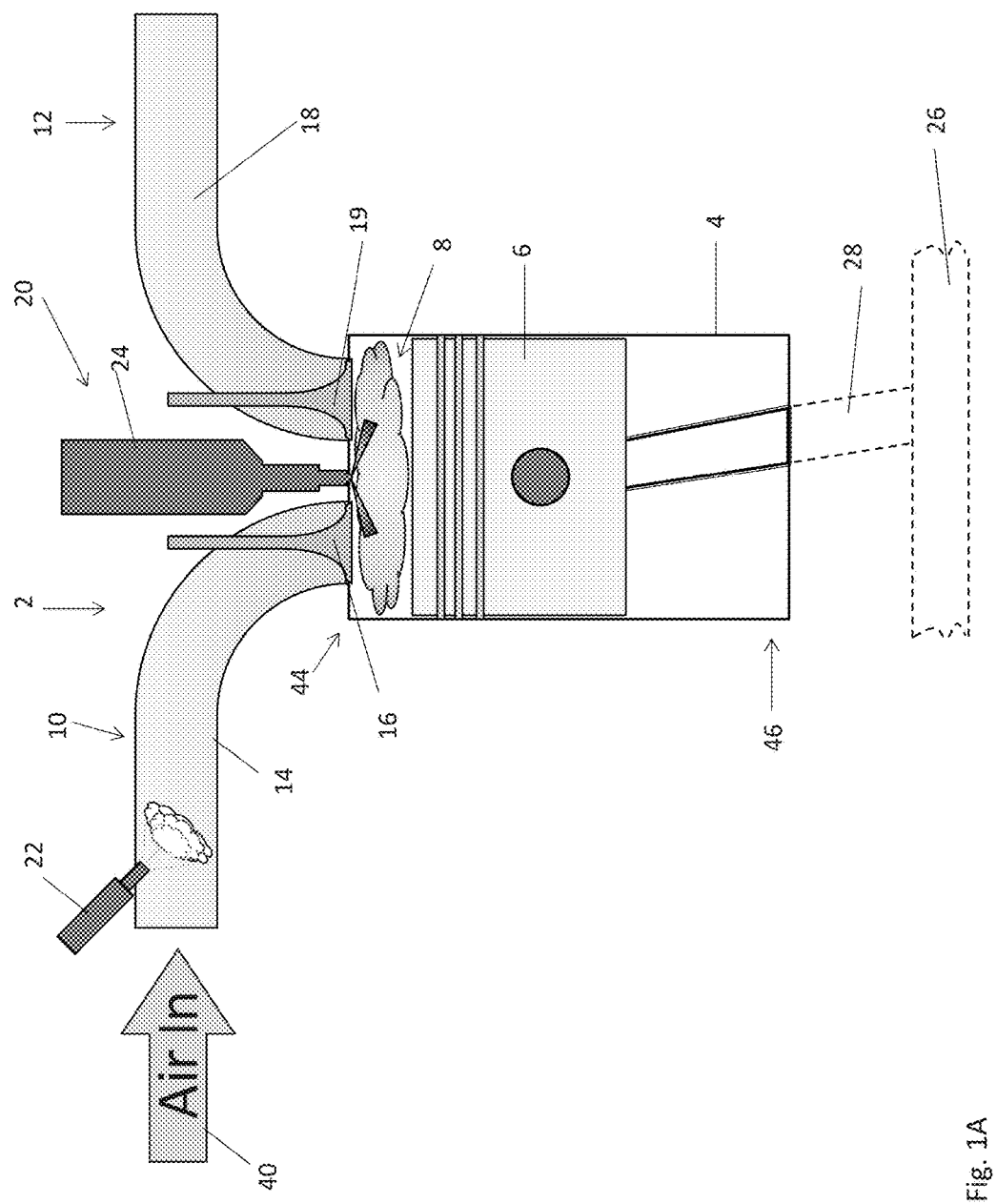
FIG. 1A is a schematic view of a portion of a dual-fuel engine of the present disclosure, including a piston movable within a cylinder of the engine, an air intake assembly, an exhaust assembly, and a fuel system fluidly coupled to the cylinder.

Although the drawings represent embodiments of the various features and components according to the present disclosure, the drawings are not necessarily to scale and certain features may be exaggerated in order to better illustrate and explain the present disclosure. The exemplification set out herein illustrates embodiments of the disclosure, and such exemplifications are not to be construed as limiting the scope of the disclosure in any manner.

DETAILED DESCRIPTION OF THE DRAWINGS

For the purpose of promoting an understanding of the principles of the disclosure, reference will now be made to the embodiments illustrated in the drawings, which are described below. It will nevertheless be understood that no limitation of the scope of the disclosure is thereby intended. The disclosure includes any alterations and further modifications in the illustrated device and described methods and further applications of the principles of the disclosure, which would normally occur to one skilled in the art to which the disclosure relates. Moreover, the embodiments were selected for description to enable one of ordinary skill in the art to practice the disclosure.

Referring to FIG. 1A, an engine 2 may be provided on an engine block or pad as a stationary engine and/or may be included in a vehicle (not shown). Engine 2 includes at least one cylinder 4 and a piston 6 therein. Piston 6 is configured to reciprocate within cylinder 4 to rotate a crankshaft 26 of engine 2 via a connecting rod 28 extending from piston 6 to crankshaft 26. Cylinder 4 defines a main combustion chamber 8 which is fluidly coupled to an air intake assembly 10 and an exhaust assembly 12 of engine 2. More particularly, and as shown in FIG. 1A, air intake assembly 10 includes an air intake duct 14 and an air intake valve 16 to provide air to main combustion chamber 8 for combustion therein. Exhaust assembly 12 includes an exhaust duct 18 and an exhaust valve 19 to release combustion byproducts from main combustion chamber 8 at the end of a combustion cycle therein.

As is also shown in FIG. 1A, engine 2 is fluidly coupled to a fuel system 20. Fuel system 20 includes at least a first fuel control member 22 fluidly coupled to air intake assembly 10 and a second fuel control member 24 fluidly coupled to cylinder 4. Fuel control members 22, 24 may be fuel injectors, a port injector, a continuous flow valve, or any other member configured to deliver a source of fuel to cylinder 4 during any portion of the engine cycle. Illustratively, second fuel control member 24 is positioned adjacent intake and exhaust valves 16, 19. In one embodiment, first fuel control member 22 is configured to supply a gaseous fuel (e.g., natural gas) to main combustion chamber 8 through intake assembly 10 and second fuel control member 24 is configured to supply a liquid fuel (e.g., diesel fuel) directly to main combustion chamber 8. In this way, fuel system 20 is configured to provide two separate sources, types, or supplies of fuel to engine 2 such that engine 2 is a dual-fuel engine.

Engine 2 also may be fluidly coupled to an after-treatment assembly 42 (FIG. 2) through exhaust assembly 12. More particularly, after-treatment assembly 42 may reduce emissions from engine 2, as disclosed further herein.

Figure 2:
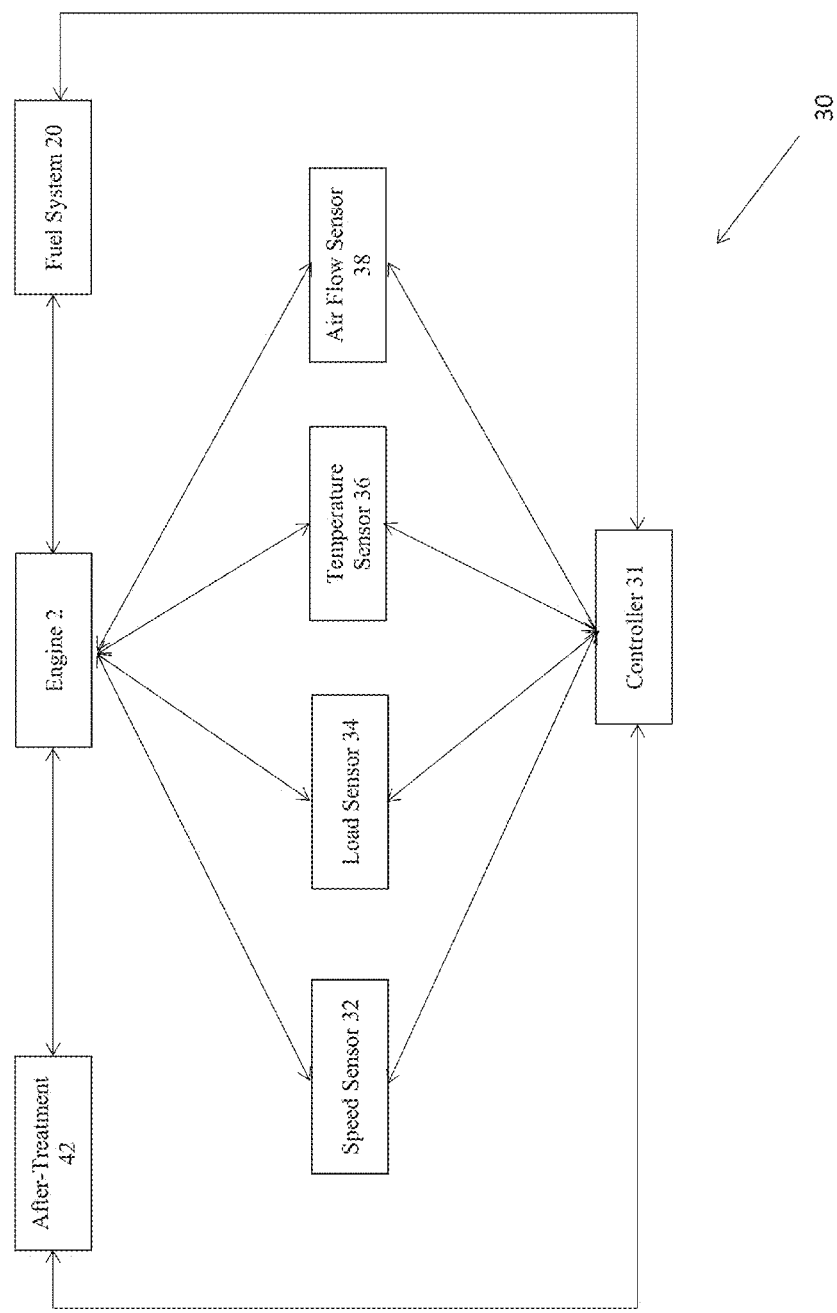
FIG. 2 is a diagrammatic view of a control system of the present disclosure.

Referring to FIG. 2, a control system 30 of the present disclosure includes at least a controller 31, a speed sensor 32 operably coupled to at least controller 31 and crankshaft 26 to determine the speed (e.g., rpm) of crankshaft 26, a load sensor 34 operably coupled to at least controller 31 and engine 2 to determine the load output by engine 2, a temperature sensor 36 operably coupled to at least controller 31 and intake assembly 10, exhaust assembly 12, and/or any other component of engine 2, and an air flow sensor 38 operably coupled to at least controller 31 and intake assembly 10 and/or exhaust assembly 12 to determine the flow rate of the air and/or combustion byproducts entering or leaving main combustion chamber 8, respectively. In this way, controller 31 is operably coupled to engine 2 through at least sensors 32, 34, 36, 38. Controller 31 also is operably coupled to fuel system 20 to control fuel injection events or cycles, both in general and in response to any parameters or conditions of engine 2. Controller 31 also may be coupled to after-treatment assembly 42 to control operation of fuel system 20 in response to various parameters of after-treatment assembly 42, as disclosed further herein.

Figure 1B:
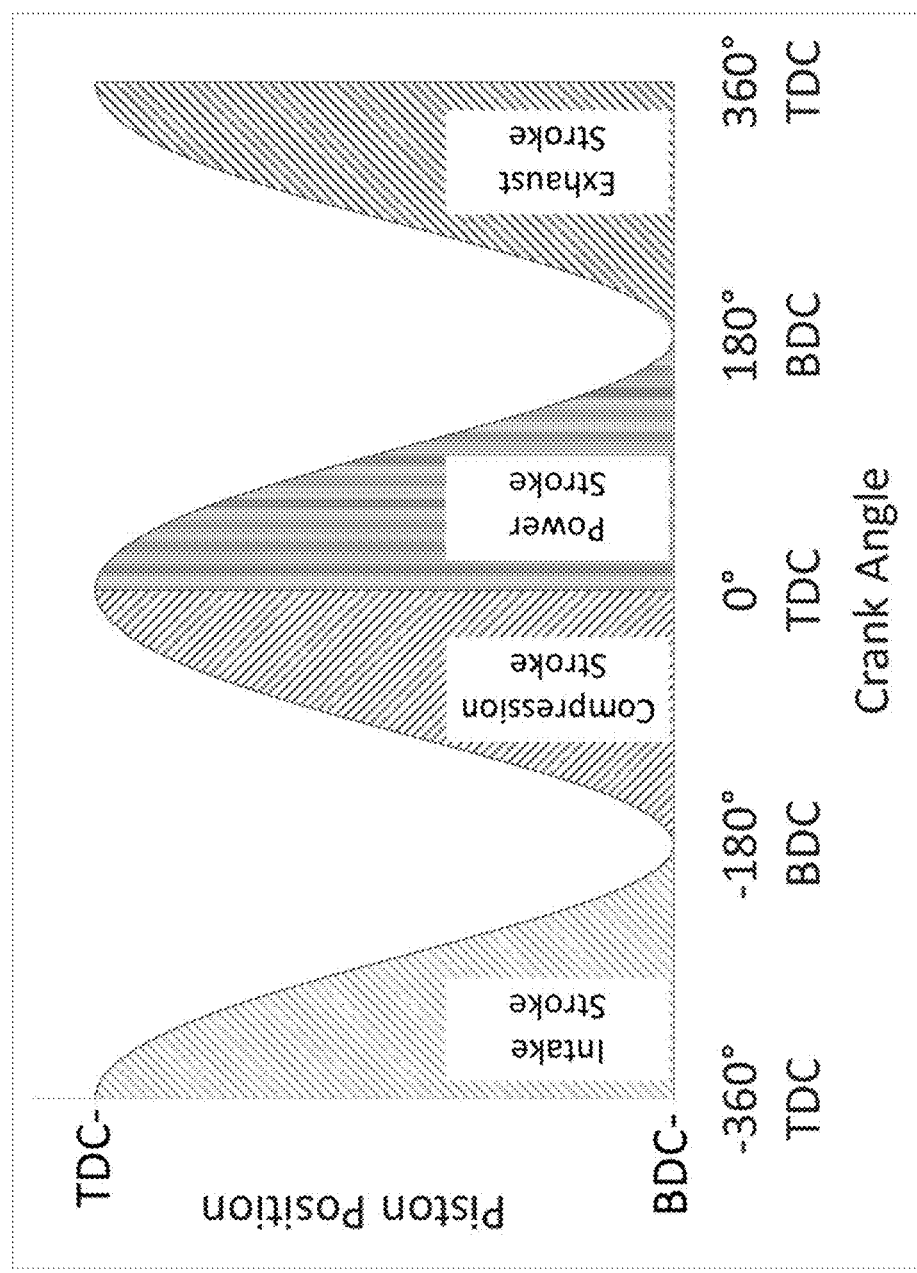
FIG. 1B is an engine cycle diagram illustrating the movement of the piston within the cylinder of the engine of FIG. 1A.

In operation and as shown in FIG. 1B, engine 2 receives fuel from fuel system 20 to operate engine 2. More particularly, piston 6 is configured to reciprocate twice within cylinder 4 between a top-dead-center ("TDC") position when positioned at an upper end 44 of cylinder 4 and adjacent valves 16, 19 and a bottom-dead-center ("BDC") position when positioned at a lower end 46 of cylinder 4 and adjacent crankshaft 26 to complete a combustion cycle for cylinder 4. In one embodiment, engine 2 is a four-stroke engine and the position of piston 6 also can be determined by the crank angle of crankshaft 26. For example, when the crank angle of crankshaft 26 is −360°, piston may start at TDC at the beginning of the intake or induction stroke to draw air into main combustion chamber 8 through intake assembly 10. As air is drawn into main combustion chamber 8, piston 6 moves to BDC to transition between the induction stroke and the compression stroke when the crank angle of crankshaft 26 is at −180°. Piston 6 starts the compression stroke by moving from BDC to TDC when the crank angle of crankshaft 26 is at −180° to compress the air in main combustion chamber 8 which increases the temperature of the air to allow fuel to combust. When piston 6 is at TDC again, piston 6 transitions between the compression stroke and the induction or power stroke, and the crank angle of crankshaft 26 is at 0°. When the crank angle of crankshaft 26 is approximately −15° to 15° (e.g., approximately 0°), fuel supplied to main combustion chamber 8 ignites to begin combustion within main combustion chamber 8. The force from the combustion of the fuel and air within main combustion chamber 8 pushes piston 6 back down to BDC during the power stroke and the crank angle of crankshaft 26 is 180° at the end of the power stroke. Lastly, at the end of the combustion cycle for cylinder 4, piston 6 moves again from BDC to TDC during the exhaust stroke to expel combustion byproducts (e.g., unburned hydrocarbons, gases, etc.) from main combustion chamber 8 through exhaust assembly 12. When piston 6 is at TDC during the exhaust stroke, the crank angle of crankshaft 26 is 360°. Fuel is added to main combustion chamber 8 for combustion therein in one or more injection events during or between any of these strokes of piston 6, as disclosed further herein.

Figure 3:
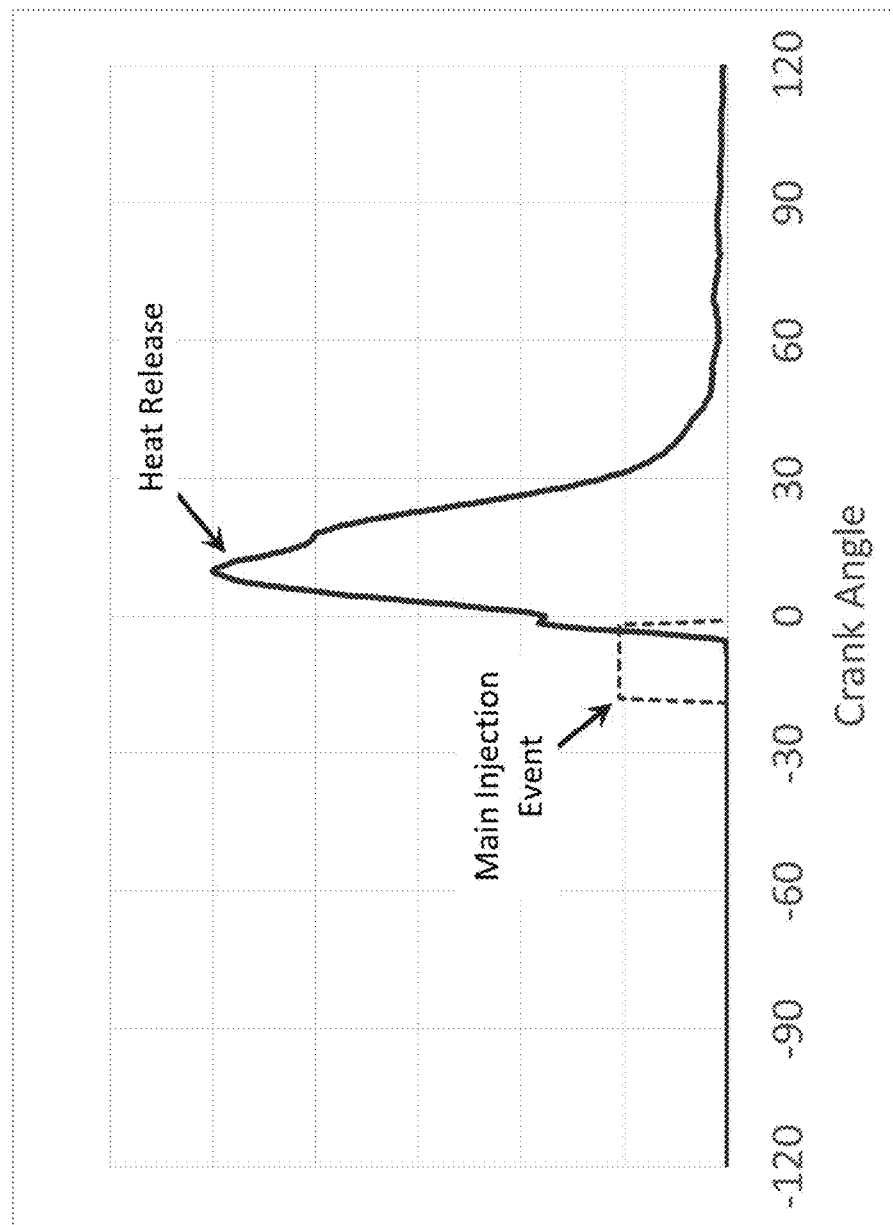
FIG. 3 discloses a prior art fuel injection strategy.

For example, as shown in FIG. 3, convention fuel systems for engine 2 may include a single injection of fuel into main combustion chamber 8. More particularly, in a convention fuel system, the single injection of fuel occurs just before the power stroke of piston 6 and when the crank angle of crankshaft 26 is approximately −30° to 0°. As such, the single supply of fuel is provided to main combustion chamber 8 just before full compression of the air in main combustion chamber 8 and is intended for combustion. Heat is generated in combustion chamber 8 through the compression of the air by piston 6 and the combustion of the fuel therein. The combustion byproducts are then exhausted from main combustion chamber 8 through exhaust assembly 12.

Figure 4:
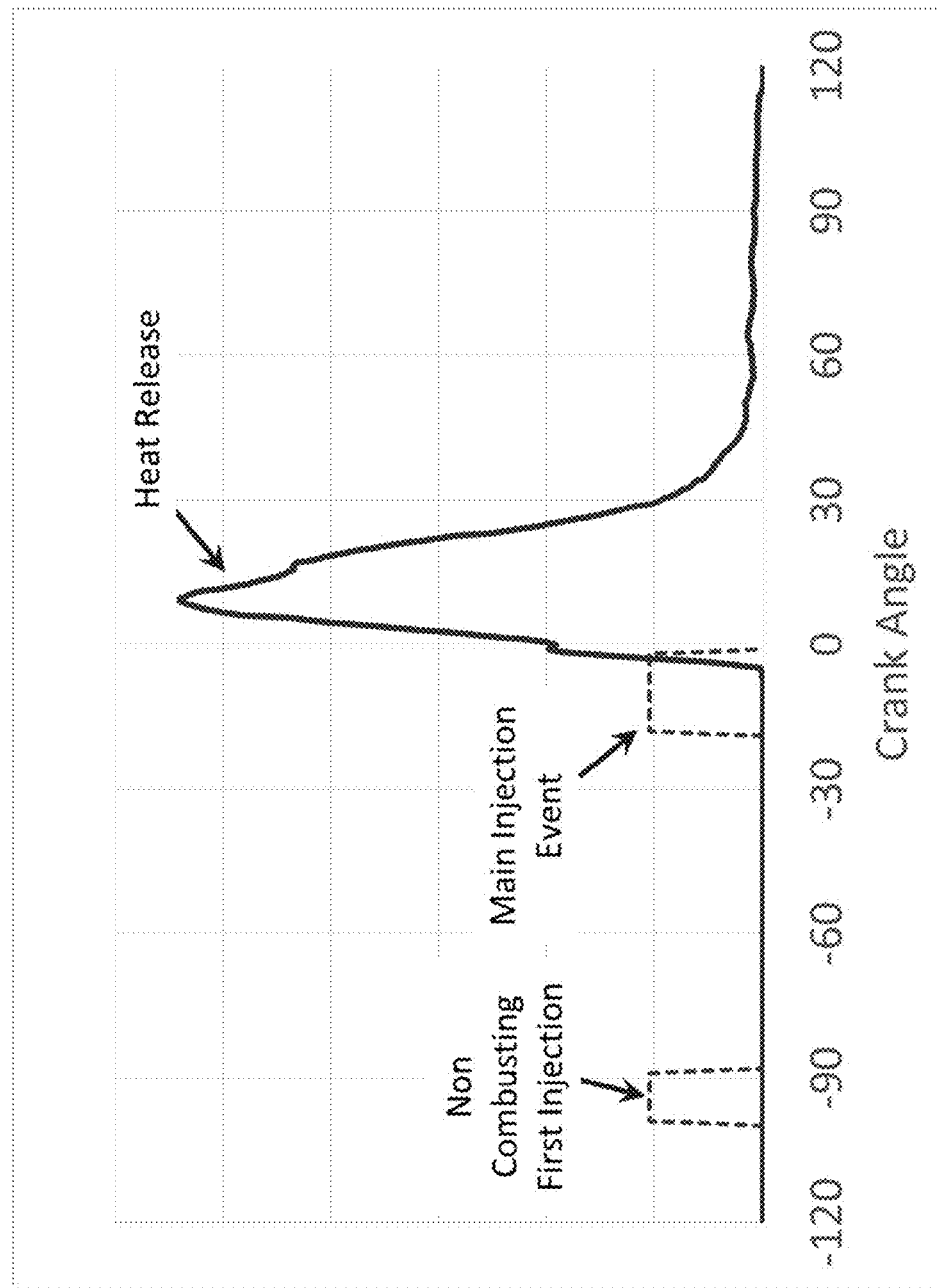
FIG. 4 discloses a first fuel injection strategy of the present disclosure.
Figure 5:
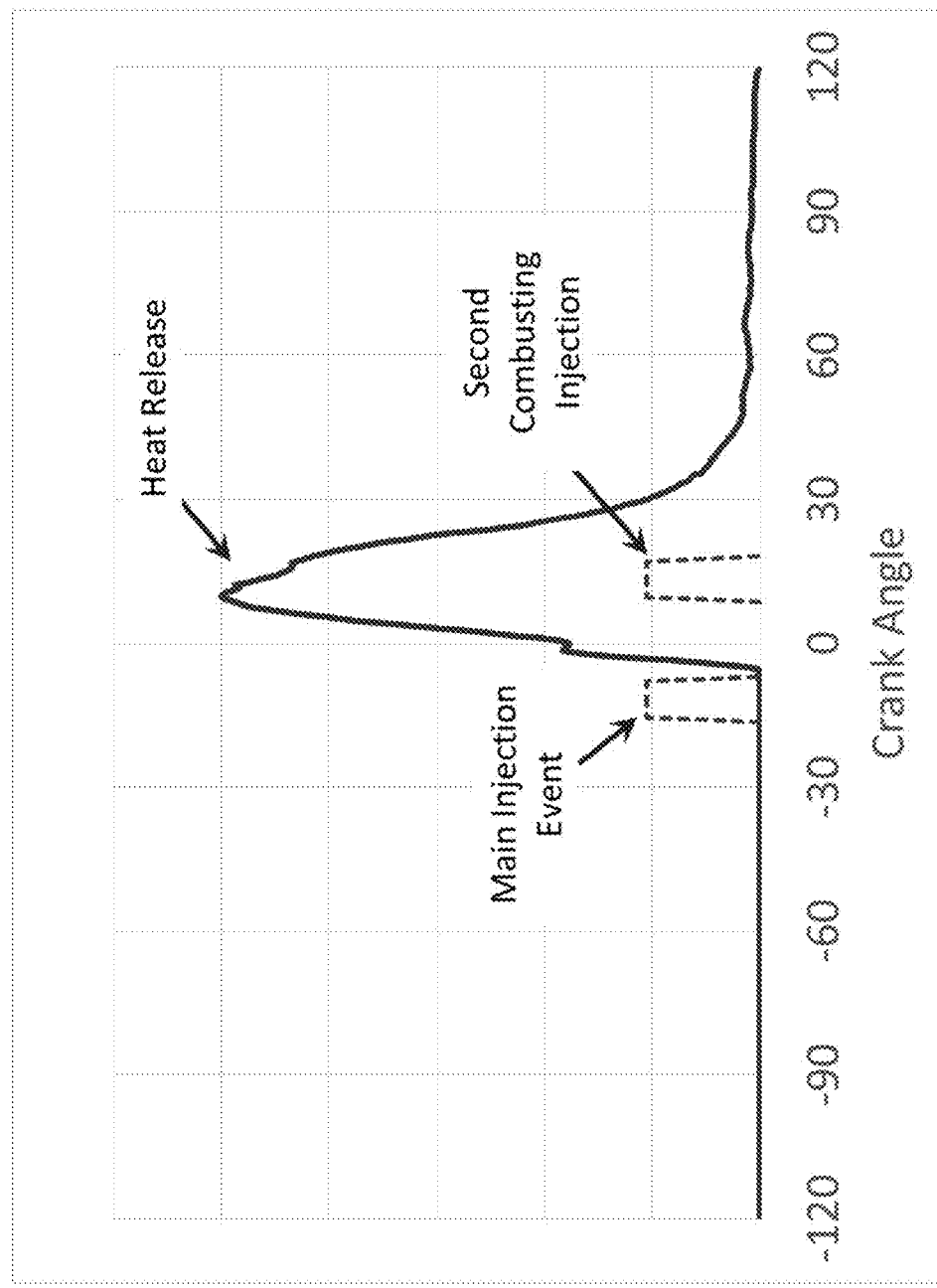
FIG. 5 discloses a second fuel injection strategy of the present disclosure.
Figure 6:
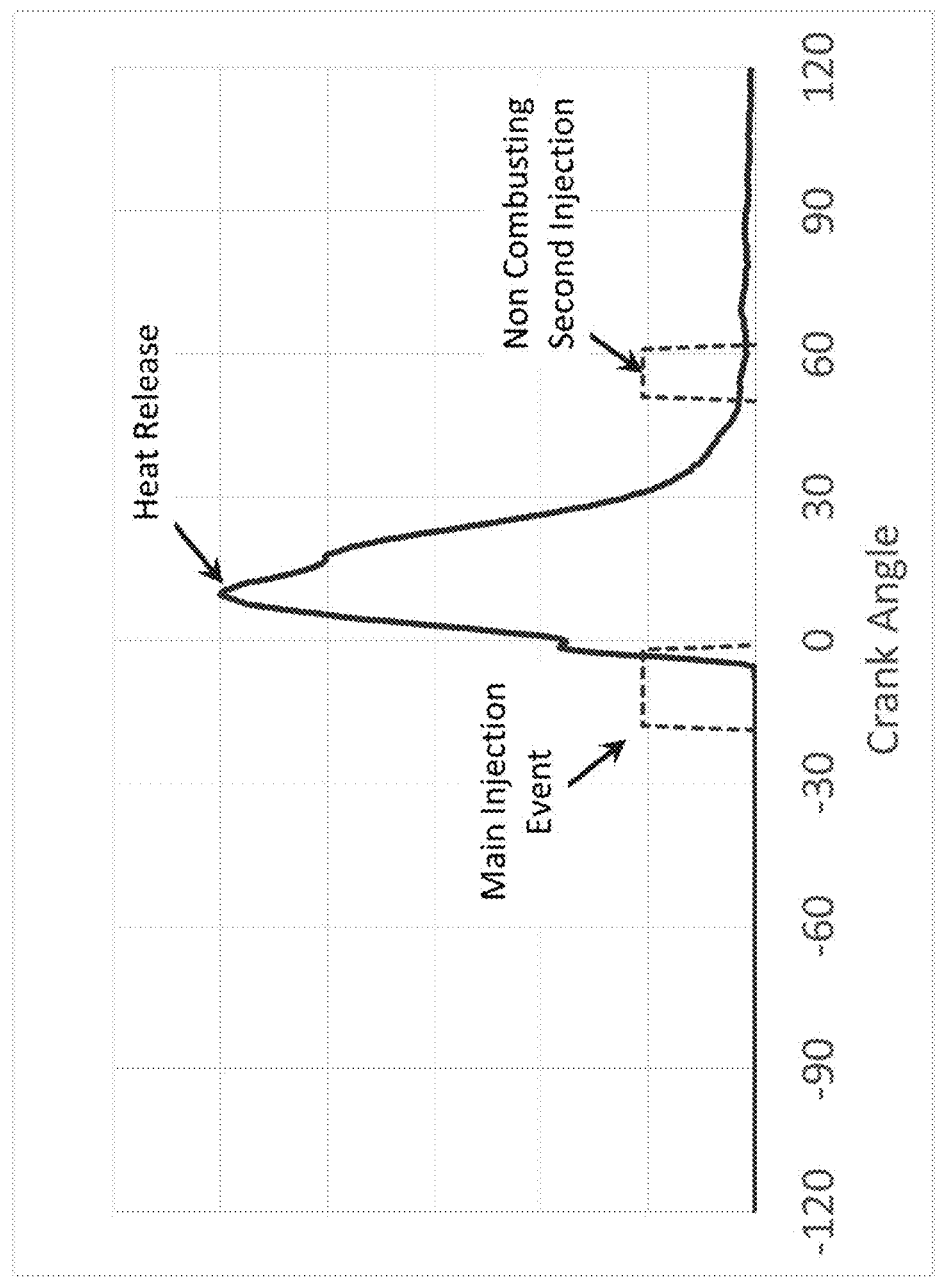
FIG. 6 discloses a third fuel injection strategy of the present disclosure.

However, fuel system 20 of the present disclosure is configured to provide fuel in a plurality of fuel injection events according to a plurality of fuel injection strategies. More particularly, fuel system 20 is configured for at least three fuel injection strategies, including a first fuel injection strategy, a second fuel injection strategy, and a third fuel injection strategy, as shown in FIGS. 4-6, respectively. Control system 30 of the vehicle is configured to employ one or more of the first, second, and third fuel injection strategies according to the operating conditions of engine 2 and/or the parameters of after-treatment assembly 42. For example, the fuel strategy employed by fuel system 20 may be dependent upon the information transmitted to controller 31 from speed sensor 32, load sensor 34, temperature sensor 36, air flow sensor 38, and/or after-treatment assembly 42. In this way, the fuel strategy for engine 2 may be dependent upon the speed of engine 2, the load of engine 2, the temperature of the oil, intake air, and/or exhaust air for engine 2, ambient air temperature, altitude or other ambient conditions, the air flow for engine 2, and any other engine or vehicle parameter. In one embodiment, the fuel strategy for engine 2 also may be dependent upon air flow through after-treatment assembly 42, the chemical compounds present in the emissions, the amount of particulate build-up within after-treatment assembly 42 (e.g., on an after-treatment filter), etc.

First Fuel Injection Strategy

As shown in FIG. 4, a first fuel injection strategy of fuel system 20 is disclosed. In one embodiment of the present disclosure, as air 40 flows into air intake assembly 10, first fuel control member 22 provides a quantity of gaseous fuel (e.g., natural gas) to air intake duct 14 such that air 40 and the gaseous fuel mix together to form a charge which enters main combustion chamber 8 through intake valve 16 (FIG. 1A). Additionally, a first quantity of liquid fuel (e.g., diesel fuel) is directly injected into main combustion chamber 8 by second fuel control member 24 during the intake stroke or early in the compression stroke. This first quantity of liquid fuel injected by second fuel control member 24 is a small quantity of fuel which evaporates into the charge (i.e., the mixture of gaseous fuel and air) in combustion chamber 8. As such, this first quantity of liquid fuel injected by second fuel control member 24 does not combust in combustion chamber 8 and, instead, defines a non-combusting, first or pre-injection event for cylinder 4. By evaporating the first quantity of liquid fuel, the liquid fuel mixes homogenously with the charge within main combustion chamber 8 to promote even distribution of the flame during subsequent ignition of fuel, as disclosed further herein.

Referring still to FIG. 4, subsequent to the first or non-combusting fuel injection event of the liquid fuel, piston 6 moves through the compression stroke toward TDC. Just before full compression in main combustion chamber 8, a second or main fuel injection event occurs to provide a second quantity of liquid fuel (e.g., diesel fuel) to main combustion chamber 8 through second fuel control member 24. This second quantity of liquid fuel supplied by second fuel control member 24 is ignited during the compression stroke. The presence of the evaporated (and non-combusted) first quantity of liquid fuel in main combustion chamber 8 promotes flame propagation to increase the completeness of combustion and decrease emissions. In this way, fuel system 20 provides multiple fuel injection events but only one combustion event during a complete combustion cycle for cylinder 4 to increase combustion within main combustion chamber 8.

In one embodiment, the quantity of liquid fuel injected by second fuel control member 24 during the pre-injection event may be approximately 10-100% of the quantity of liquid fuel injected by second fuel control member 24 during the main injection event. For example, if engine 2 has a 19 L capacity, the first quantity of liquid fuel may be approximately 1-15 mm$^3$ and, more particularly, 2-3 mm$^3$, and the second quantity of liquid fuel may be 1-15 mm$^3$ and, more particularly, may be 5-10 mm$^3$. Additionally, in one embodiment, the total quantity of liquid fuel injected into main combustion chamber 8 through second fuel control member 24 (i.e., the sum of the first quantity of liquid fuel and the second quantity of liquid fuel) may be less than the quantity of gaseous fuel introduced into main combustion chamber 8 through first fuel control member 22. For example, the total fuel energy of liquid fuel injected into main combustion chamber 8 through second fuel control member 24 may be approximately 0.5-100% of the total fuel energy of gaseous fuel injected into main combustion chamber 8 through first fuel control member 22. In one embodiment, the total fuel energy of liquid fuel injected into main combustion chamber 8 through second fuel control member 24 may be approximately 2.0-15% of the total fuel energy of gaseous fuel injected into main combustion chamber 8 through first fuel control member 22. It would be apparent to one of ordinary skill in the art with the benefit of this disclosure to select a fuel energy range of liquid and/or gaseous fuel to provide to main combustion chamber 8.

Second Fuel Injection Strategy

Referring now to FIG. 5, fuel system 20 of the present disclosure also is configured to provide fuel in a plurality of fuel injection events through a second fuel injections strategy. In one embodiment of the second fuel injection strategy, as air 40 flows into air intake assembly 10, first fuel control member 22 provides a quantity of gaseous fuel (e.g., natural gas) to air intake duct 14 such that air 40 and the gaseous fuel mix together to form a charge which enters main combustion chamber 8 through intake valve 16 (FIG. 1A).

Referring still to FIG. 5, just before full compression in main combustion chamber 8, a first or main fuel injection event occurs to provide a first quantity of liquid fuel (e.g., diesel fuel) to main combustion chamber 8 through second fuel control member 24. This first quantity of liquid fuel supplied by second fuel control member 24 is ignited during the compression stroke of piston 6. Additionally, a second quantity of liquid fuel is injected into main combustion chamber 8 during the power stroke which also ignites within main combustion chamber 8. These back-to-back combustion events within main combustion chamber 8 increase the turbulence therein to increase mixing and flame speed in the gaseous fuel of the charge. As a result of increased mixing and flame speed, the completeness of combustion increases and emissions decrease. In this way, the embodiment of FIG. 5 is configured to provide two combustion events through two separate injections of liquid fuel during one combustion cycle for cylinder 4.

In one embodiment, the first quantity of liquid fuel injected by second fuel control member 24 may be may be less than, the same as, or greater than the second quantity of liquid fuel injected by second fuel control member 24. In one embodiment, if engine 2 has a 19 L capacity, the first and second quantities of liquid fuel injected into main combustion chamber 8 each may be approximately 1-10 mm$^3$ and, more particularly, each may be 5 mm$^3$. Additionally, in one embodiment, the total quantity of liquid fuel injected into main combustion chamber 8 through second fuel control member 24 (i.e., the sum of the first quantity of liquid fuel and the second quantity of liquid fuel) may be less than the quantity of gaseous fuel introduced into main combustion chamber through first fuel control member 22. For example, the total fuel energy of liquid fuel injected into main combustion chamber 8 through second fuel control member 24 may be approximately 0.5-100% of the total fuel energy of gaseous fuel injected into main combustion chamber 8 through first fuel control member 22. In one embodiment, the total fuel energy of liquid fuel injected into main combustion chamber 8 through second fuel control member 24 may be approximately 2.0-15% of the total fuel energy of gaseous fuel injected into main combustion chamber 8 through first fuel control member 22. It would be apparent to one of ordinary skill in the art with the benefit of this disclosure to select a quantity or range of liquid and/or gaseous fuel to provide to main combustion chamber 8.

Third Fuel Injection Strategy

Referring now to FIG. 6, fuel system 20 of the present disclosure also is configured to provide fuel in a plurality of fuel injection events through a third fuel injection strategy. In one embodiment of the third fuel injection strategy, as air 40 flow into air intake assembly 10, first fuel control member 22 provides a quantity of gaseous fuel (e.g., natural gas) to air intake duct 14 such that air 40 and the gaseous fuel mix together to form a charge which enters main combustion chamber 8 through intake valve 16 (FIG. 1A).

Figure 7:
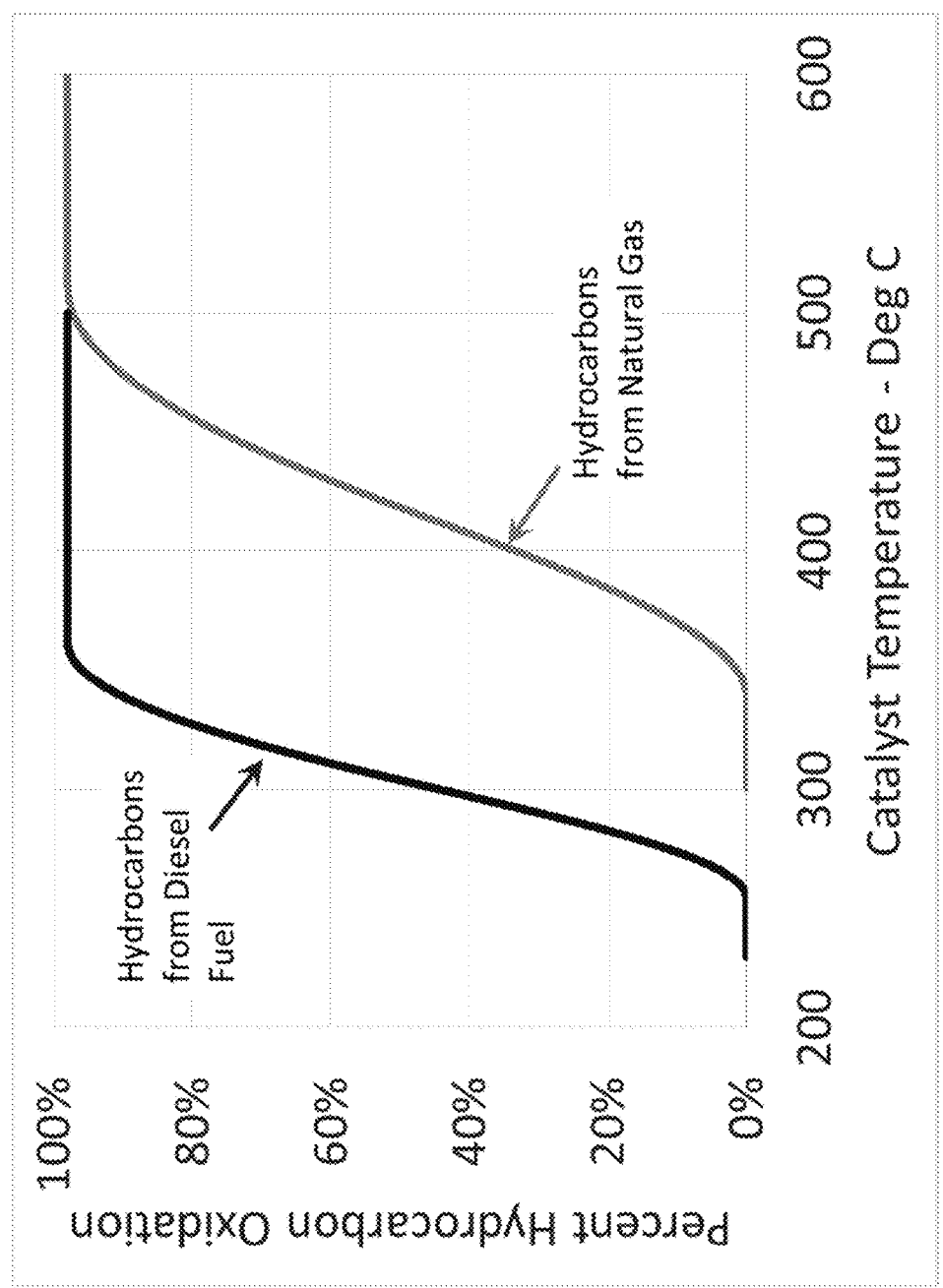
FIG. 7 is an illustrative graphical representation of the catalyst temperature at which unburned hydrocarbons of diesel fuel and natural gas are oxidized.

As shown in FIG. 6, just before the end of the compression stroke in main combustion chamber 8, a first or main fuel injection event occurs to provide a first quantity of liquid fuel (e.g., diesel fuel) to main combustion chamber 8 through second fuel control member 24. This quantity of fuel supplied by second fuel control member 24 is ignited during the compression stroke and combustion in main combustion chamber 8 is completed. Subsequently, a second quantity of liquid fuel is injected into main combustion chamber 8 late in the power stroke or early in the exhaust stroke but does not cause combustion in main combustion chamber 8 because the temperature therein has decreased after combustion of the first quantity of liquid fuel and the gaseous fuel. Instead, the second quantity of liquid fuel is supplied to main combustion chamber 8, where it evaporates and leaves main combustion chamber 8 through exhaust valve 19. As such, this unburned second quantity of liquid fuel is provided to increase the effectiveness of the after-treatment by reacting with the catalyst of after-treatment assembly 42 to release heat. More particularly, the uncombusted hydrocarbons of the liquid fuel may react with the oxidation catalyst of after-treatment assembly 42 at a lower temperature than the uncombusted hydrocarbons of the gaseous fuel. For example, and as shown in FIG. 7, the uncombusted hydrocarbons of diesel fuel may react or oxidize with the oxidation catalyst at approximately 250-350° C. which releases energy and increases the temperature of the oxidation catalyst to at least 350-500° C. At 350-500° C., the oxidization catalyst of after-treatment assembly 42 is able to react/oxidize with the uncombusted hydrocarbon of natural gas to improve emissions. Additionally, in one embodiment, the increased temperature of the oxidization catalyst caused by the reaction of the uncombusted hydrocarbons of the liquid fuel may allow for removal of sulfur and/or carbon particulates which may accumulate on the filter (not shown) within after-treatment assembly 42. Therefore, emissions from engine 2 may be reduced by oxidizing unburned hydrocarbons of the gaseous fuel and removing/cleaning accumulated particles from the after-treatment filter because the second injection of liquid fuel increases the temperature within after-treatment assembly 42.

In one embodiment, the first quantity of liquid fuel injected by second fuel control member 24 may be may be less than, the same as, or greater than the second quantity of liquid fuel injected by second fuel control member 24. Additionally, in one embodiment, the total quantity of liquid fuel injected into main combustion chamber 8 through second fuel control member 24 (i.e., the sum of the first quantity of liquid fuel and the second quantity of liquid fuel) may be less than the quantity of gaseous fuel introduced into main combustion chamber through first fuel control member 22. For example, the total fuel energy of liquid fuel injected into main combustion chamber 8 through second fuel control member 24 may be approximately 0.5-100% of the total fuel energy of gaseous fuel injected into main combustion chamber 8 through first fuel control member 22. In one embodiment, the total fuel energy of liquid fuel injected into main combustion chamber 8 through second fuel control member 24 may be approximately 2.0-15% of the total fuel energy of gaseous fuel injected into main combustion chamber 8 through first fuel control member 22. It would be apparent to one of ordinary skill in the art with the benefit of this disclosure to select a quantity or range of liquid and/or gaseous fuel to provide to main combustion chamber 8.

It may be appreciated that the embodiments of FIGS. 4-6 may be combined in any combination to create additional fuel injection strategies for cylinder 4. For example, if the embodiment of FIG. 6 is combined with the embodiment of FIG. 4, the combustion cycle for cylinder 4 will include three injections of liquid fuel from second fuel control member 24. More particularly, in one embodiment, the combustion cycle for cylinder 4 may include a non-combusting first or pre-injection event, a combusting second or main injection event, and a non-combusting third or post-injection event, according to the embodiments of FIGS. 4 and 6. Alternatively, in a further embodiment, the combustion cycle for cylinder 4 may include a combusting first injection event, a combusting second injection event, and a non-combusting third or post-injection event, according to the embodiments of FIGS. 5 and 6.

While the embodiments have been described as having exemplary designs, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this invention pertains.

The invention claimed is:

1. A method of controlling at least one fuel injection event during a fuel cycle of an engine using a controller, comprising:
   supplying, using the controller, a first quantity of a first fuel to the engine;
   supplying, using the controller, a charge including a second fuel and air to the engine, the first fuel being different from the second fuel;
   mixing the first fuel with the charge;
   supplying, using the controller, a second quantity of the first fuel to the engine after supplying the first quantity of the first fuel to the engine and before igniting at least a portion of the first and second fuels; and igniting at least the portion of the first and second fuels in response to supplying the second quantity of the first fuel.

2. The method of claim 1, wherein supplying the first quantity of the first fuel includes supplying diesel fuel and supplying the charge includes supplying natural gas.

3. The method of claim 1, wherein supplying the second quantity of the first fuel causes ignition of at least a portion of the first and second fuels.

4. The method of claim 1, wherein igniting at least a portion of the first and second fuels occurs after supplying the first quantity of the first fuel and mixing the first fuel with the charge.

5. The method of claim 1, further comprising evaporating the first quantity of the first fuel prior to igniting at least a portion of the first and second fuels.

6. The method of claim 4, wherein mixing the first fuel with the charge occurs after evaporating the first quantity of the first fuel.

7. The method of claim 1, further comprising igniting at least a portion of the first quantity of the first fuel before supplying the second quantity of the first fuel.

8. The method of claim 1, wherein the first quantity of the first fuel is less than the second quantity of the first fuel.

9. The method of claim 8, wherein the first quantity of the first fuel is less than half of the second quantity of the first fuel.

10. The method of claim 1, further comprising supplying a third quantity of the first fuel after igniting at least a portion of the first and second fuels.

11. A method of controlling at least one fuel injection event during a fuel cycle of an engine using a controller, comprising:
supplying, using the controller, a first quantity of a liquid fuel to a cylinder;
supplying, using the controller, a charge including a gaseous fuel and air to the cylinder;
combusting at least a portion of the liquid and gaseous fuels in response to supplying the first quantity of the liquid fuel; and
supplying, using the controller, a second quantity of the liquid fuel after combusting at least a portion of the first quantity of liquid fuel and the gaseous fuel.

12. The method of claim 11, further comprising exhausting the second quantity of the liquid fuel from the cylinder and directing the second quantity of the liquid fuel to an after-treatment assembly.

13. The method of claim 12, further comprising reacting the second quantity of the liquid fuel with an oxidation catalyst of the after-treatment assembly.

14. The method of claim 13, further comprising increasing a temperature of the after-treatment assembly in response to reacting the second quantity of the liquid fuel.

15. The method of claim 14, further comprising oxidizing uncombusted hydrocarbons of the gaseous fuel exhausted from the cylinder and into the after-treatment assembly in response to increasing the temperature of the after-treatment assembly.

16. The method of claim 11, wherein supplying the first quantity of the liquid fuel includes supplying diesel fuel and supplying the charge includes supplying natural gas.

17. The method of claim 11, wherein combusting at least a portion of the liquid and gaseous fuels occurs when supplying the first quantity of the liquid fuel.

18. The method of claim 11, further comprising combusting the first quantity of the liquid fuel before supplying the second quantity of the liquid fuel.

19. A fuel assembly, comprising:
a control system configured to control at least one fuel injection event during a fuel cycle of an engine;
a first fuel control member operably coupled to the control system to release a first fuel to mix with air; and
a second fuel control member operably coupled to the control system to release a first quantity of a second fuel during a pre-combustion portion of the fuel cycle to mix with the first fuel and a second quantity of the second fuel during a combustion portion of the fuel cycle.

20. The fuel assembly of claim 19, wherein the first fuel is a gaseous fuel and the second fuel is a liquid fuel.

21. The fuel assembly of claim 19, wherein the first quantity of the second fuel is less than the second quantity of the second fuel.

22. The fuel assembly of claim 19, wherein the control system is configured to release a third quantity of the second fuel during a post-combustion portion of the fuel cycle.

23. The fuel assembly of claim 19, wherein the control system is configured to release the first fuel during the intake stroke of a piston.

24. The fuel assembly of claim 19, wherein the second quantity of the second fuel initiates combustion of the first and second quantities of the second fuel during a compression stroke of a piston.

* * * * *